W. C. MEREDITH AND W. C. WILLIS.
BORING TOOL.
APPLICATION FILED DEC. 19, 1916.
1,352,825.
Patented Sept. 14, 1920.
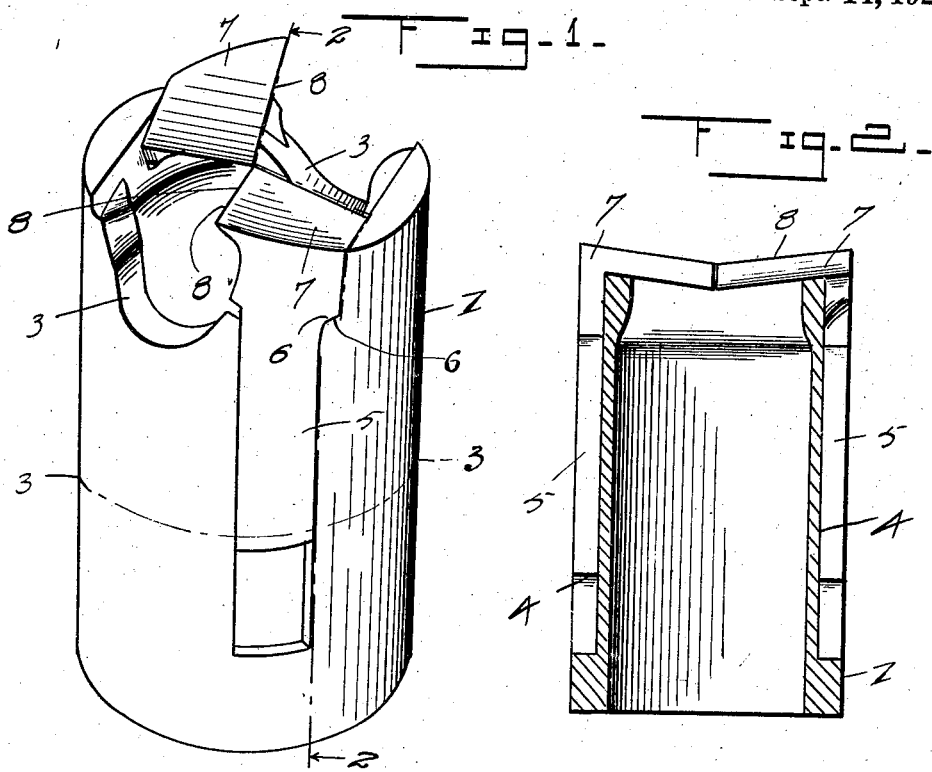
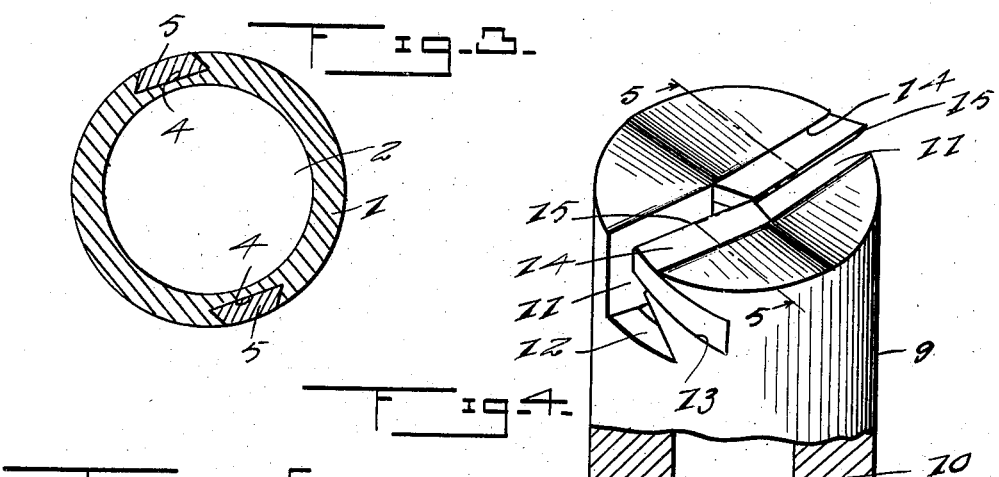
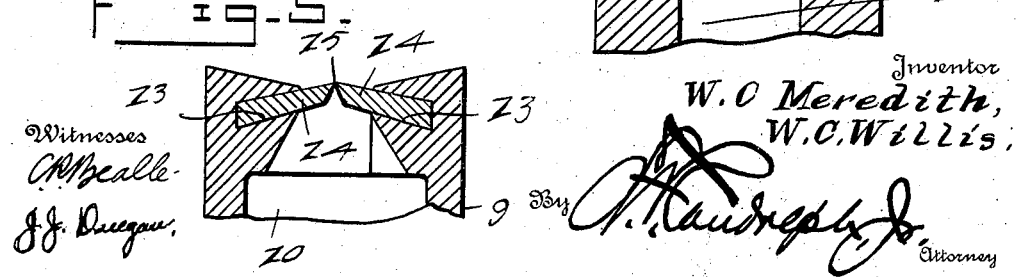
Inventor
W. C. Meredith,
W. C. Willis.

UNITED STATES PATENT OFFICE.

WILLIAM C. MEREDITH AND WILLIAM C. WILLIS, OF ATLANTA, GEORGIA, ASSIGNORS OF ONE-THIRD TO R. H. WHITE, OF ATLANTA, GEORGIA.

BORING-TOOL.

1,352,825.

Specification of Letters Patent.

Patented Sept. 14, 1920.

Application filed December 19, 1916. Serial No. 137,798.

*To all whom it may concern:*

Be it known that we, WILLIAM C. MEREDITH and WILLIAM C. WILLIS, citizens of the United States, residing at Atlanta, in the county of Fulton and State of Georgia, have invented certain new and useful Improvements in Boring - Tools; and we do hereby declare the following to be a full, clear, and exact description of the invention, such as will enable others skilled in the art to which it appertains to make and use the same.

This invention relates to improvements in boring and drilling tools for drilling wooden pipes, conduits and the like; and an object of the invention is the provision of a tool of this type that will drill a smooth and straight bore, and including a novel type of cutter head having a passage therein through which the shavings and the like, will be conveyed through the head and discharged at the rear end thereof.

Another object of the invention is the provision of a tool of this character having a novel type of removable cutting bit that can be conveniently associated with the head and removed therefrom, expeditiously, and of such configuration that they will cut an even and straight bore.

Other objects will appear and be better understood from that embodiment of our invention of which the following is a specification, reference being had to the accompanying drawings forming a part thereof, in which:

Figure 1 is a perspective view of a cutter head constructed in accordance with our invention and having associated therewith the improved cutting bit, Fig. 2 is a vertical sectional view, taken on the line 2—2 of Fig. 1, Fig. 3 is a horizontal sectional view, taken on the line 3—3 of Fig. 1, Fig. 4 is a detail perspective view of a modified form of cutter head and bit.

Fig. 5 is a detail section view taken on the line 5—5 of Fig. 4.

Referring to the drawings in detail, and particularly to Figs. 1, 2 and 3, the cutter head is designated by the numeral 1 and is of cylindrical shape, having a bore 2 therein. The head 1 is provided, at one end thereof, and at diametrically opposite points with cutout portions 3, through which the shaving, and the like, can enter the head and be received by the bore 2, so that the shavings can be conveyed to the opposite end of the head, during the drilling operation. The head 1 is also provided, at diametrically opposite points, with elongated grooves 4 that are of dovetail shape in cross section, as shown in Fig. 3 of the drawings. The grooves 4 are located adjacent the respective cutout portions 3, but are of lengths exceeding the length of the cutout portions 3, as shown in Fig. 1 of the drawings. Removably associated with the head 1 is a pair of cutting bits, each of which includes a shank 5, which is removably received by one of the grooves 4, the said shank being of dovetail shape in cross section, as shown in Fig. 3, so as to agree with the configuration of the grooves 4 and also to prevent accidental withdrawal of the shank from the grooves 4 during the drilling operation. The shanks 5 are each provided at one side, and adjacent the outer end thereof, with a shoulder 6, which overlies a shoulder 6' formed on the adjacent wall of the dovetail slot 4, so as to limit the inward movement of the shank 5. The upper ends of the shanks 5 are provided with heads 7, each of which is of substantially rectangular shape in configuration, as shown in Fig. 1 of the drawings. The heads 7 overlie the bore 2 in the cutter head 1, and are also slightly directed inwardly, as shown in Fig. 2 of the drawings, and each head 7 has one edge thereof formed to provide a cutting edge 8. The heads 7 are so arranged with respect to each other that the inner end of the cutting edge on one head opposes the inner end of the cutting edge 8 on the other head and the said cutting edges lie, respectively, at obtuse angles to each other. The angular arrangement of the cutting edges 8 will effect a straight and even bore to be cut throughout the length of the work. The shavings and such material cut from the work, during the drilling operation, will pass through the bore and be discharged therefrom at the upper end of the head.

In the construction shown in Fig. 4 the cutting head designated 9 has a longitudinally extending bore 10 therein similar to the bore 2 in the head 1, and one end of the head 9 is provided with a pair of slots 11, which are offset from each other and each has one end opening into one side of the head 9 and the other end communicating with the bore 10 in the head 9, and each slot has one wall thereof undercut, as shown at 12. A pair of cutting bits 13 is removably associated with the head 9 and the said cutting bits are arranged in offset relation with respect to each other and are received by recesses 14, formed in advance of the undercut portions 12. The recesses 14 are inclined throughout their width at an angle to the transverse axis of the head 9 and are also inclined inwardly throughout their length at an angle to the longitudinal axis of the head 9. The cutting bits 13 are each of rectangular shape and by virtue of the inclination of the recesses 14 that receive the cutting bits 11, the said cutting bits will be disposed at an incline both to the transverse axes and longitudinal axes of the heads 9. Each cutting bit has one of the longitudinal sides thereof disposed opposite one of the slots 11 and beveled to provide a cutting edge 15. The terminal of that end of the head 9 that has the cutting bits 13 associated therewith is dished, as shown in Fig. 4, and by virtue of the inclination of the cutting bits 13 the outer ends of the cutting edges 15 will be disposed beyond the plane of the adjacent terminal of the heads 9 and the inner ends of the cutting edges 15 will be disposed within the plane of the terminal of the adjacent end of the head 9. The slots 11 and the undercut portions 12 admit of shavings and like material that have been cut from the work, during the drilling operation, entering the bore 10 in the head 9 and being discharged through the rear end of the bore 10.

It is evident that various changes might be resorted to in the construction, form and arrangement of the several parts without departing from the spirit and scope of the invention as claimed.

What we claim is:

1. A boring tool comprising a cylindrical head having a bore, and a pair of bits removably secured to said head and disposed over one end of the bore and arranged in offset relation with respect to each other, said bits being inclined both to the transverse axis and longitudinal axis of said head and each having one longitudinal side thereof beveled to provide cutting edges so that the inner end of one cutting edge opposes the inner end of the other cutting edge and at obtuse angles to each other, said head having oppositely disposed cut-out portions and arranged adjacent the outer ends of the bits.

2. A boring tool including a head having a bore, said head having at diametrically opposite points cut-out portions and elongated slots adjacent thereto and said slots being of dove-tail shape in cross section, shanks of dove-tail construction fitted in said slots, a shoulder formed on one wall of each slot, shoulders formed on the shanks and engaging the first named shoulders to limit the movement of the shanks in said slots, and cutting heads formed on said shanks and overlying the bore and directed inwardly and having one edge sharpened to form cutting edges arranged at obtuse angles to each other, with the inner end of one cutting edge opposing the inner end of the other cutting edge.

3. A boring tool comprising a hollow head, and a pair of cutting bits located at the forward end of the head and extending respectively in opposite directions at a forward and lateral inclination from a point located centrally of and within the plane of the forward end of the head to its lateral wall, the respective bit being also arranged on opposite sides of a plane extending centrally and longitudinally of the head.

4. A boring tool comprising a head having a bore and oppositely disposed recesses in communication with said bore, shanks secured to the head, substantially rectangular shaped cutting bits formed on the shanks and overlying the bore and extending in opposite directions and beveled to provide cutting edges.

In testimony whereof we affix our signatures in presence of two witnesses.

WILLIAM C. MEREDITH.
WILLIAM C. WILLIS.

Witnesses:
A. H. McDonald,
W. H. Marechal.